UNITED STATES PATENT OFFICE.

HARRY C. HETHERINGTON AND JOSEPH M. BRAHAM, OF WASHINGTON, DISTRICT OF COLUMBIA.

METHOD OF MAKING DICYANDIAMIDE.

1,423,799.                    Specification of Letters Patent.    Patented July 25, 1922.

No Drawing.        Application filed June 23, 1921.    Serial No. 481,058.

*To all whom it may concern:*

Be it known that we, HARRY C. HETHERINGTON and JOSEPH M. BRAHAM, citizens of the United States, and residents of Washington, District of Columbia, have invented an Improvement in Methods of Making Dicyandiamide, of which the following is a specification.

The main object of the invention is the provision of a method in which the losses of nitrogen are reduced to a minimum and which is economical and efficient and causes a very complete conversion to dicyandiamide of the cyanamide content of lime-nitrogen.

We are aware that it has been proposed to manufacture dicyandiamide by treating an aqueous extract of lime-nitrogen with a large excess of $NH_4OH$ and passing in $CO_2$ to cause separation to $CaCO_3$. Such a process is dependent for its successful operation upon the use and recovery of very large amounts of ammonia, involving considerable expense and complicated apparatus.

We are also familiar with the German Patent #279,133 in which is described a process for producing dicyandiamide from lime-nitrogen. The process as disclosed in said patent has the disadvantages that by operating under the conditions therein set forth great losses of nitrogen may occur, with resulting low yields of dicyandiamide.

In our invention, on the other hand, we have so established conditions of operation that losses of nitrogen are reduced to a minimum, and maximum yield of dicyandiamide is assured.

In order that our invention may be more clearly understood and that it may be more easily differentiated from methods previously proposed, the following explanation is submitted.

It is known that in an aqueous extract of lime-nitrogen the polymerization of $H_2CN_2$ to $(HCN_2)_2$ proceeds most readily when there is present in the solution two molecules of free $H_2CN_2$ per molecule of $Ca(HCN_2)_2$. In a lime-nitrogen extract the nitrogen is present largely in the form of calcium acid cyanamide. Hence to obtain free $H_2CN_2$ in solution it is necessary to add an acid stronger than $H_2CN_2$. Since the latter is a very weak acid any mineral acid will serve to displace it. Calcium acid cyanamide contains two molecules of $H_2CN_2$ for each molecule of calcium, so it will be seen that the addition of sufficient acid to combine with one-half of the calcium present will liberate the quantity of $H_2CN_2$ required to establish the desired ratio between free and combined $H_2CN_2$. This will be seen most readily from the following equation:

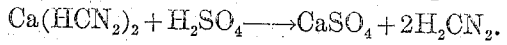
$$Ca(HCN_2)_2 + H_2SO_4 \longrightarrow CaSO_4 + 2H_2CN_2.$$

During polymerization, free $H_2CN_2$ combines with the ion $HCN_2$, which is present in solution through the dissociation of $Ca(HCN_2)_2$.

We have investigated the cause of this reaction at various temperatures and have discovered that products of side reactions, chiefly urea and ammonia are formed in increasing quantities with rising temperatures. For example, we have found that if the reaction is caused to proceed for two hours at 55° C., the urea formed constitutes 3% of the total nitrogen in solution, while at temperatures of 70°, 80° and 95° C. the urea becomes 8%, 16% and 25.8% respectively. That temperature rather than time is the main factor in the formation of urea during polymerization is shown by an experiment in which the polymerization reaction was caused to proceed at a temperature of 80° C. for a period of 1½ hours. In this case urea was formed to the extent of 13.7% of the nitrogen present. This is only 2.3% less than was formed in two hours. In view of these facts it would appear advisable to carry out the reaction at a lower temperature and for a longer time. Experiments to determine the minimum time required for practically complete conversion at 60° C. developed the fact that 30% of the nitrogen remained as cyanamide after two hours, and that after four hours 1.6% remained as cyanamide, while 8% was in the form of urea. We have found experimentally that the maximum yield of dicyandiamide is obtained when the reaction is carried out at about 75° C. for a period of two hours. Under these conditions 85% of the nitrogen in solution is obtained as dicyandiamide.

An essential feature of our invention is the fact in each step of our process special precautions are taken to restrain the formation of urea. For example, we have found that while lime-nitrogen is being extracted, urea is formed to the extent of more than 12% of the nitrogen present if the temperature is raised to 100° C.

In practice we have found that this loss is materially lessened if the temperature is kept below 85° C.

In carrying out our invention we prefer to proceed as follows:

Lime-nitrogen is mixed with water and agitated for about thirty minutes at a temperature preferably not exceeding 50° C. (While a temperature not exceeding 50° C. is preferable, temperatures up to 85° may be used where time is of greater importance than the yield.) By operating at this temperature we obtain in solution practically as much nitrogen as would be obtained at higher temperatures. Of particular importance is the fact that less than 2% of the nitrogen is in the form of urea, whereas in extractions made at 100° C. more than 12% of the nitrogen is lost to the process in the form of urea.

To the filtered solution is added just enough sulphuric acid to combine with one-half of the calcium in solution. The temperature of the mixture is then raised to 75° C. and maintained at this point for two hours. During this time the remaining calcium is neutralized by the introduction of sulphuric acid at a uniform rate. We find it convenient to introduce the sulphuric acid under pressure in very finely divided streams or as a spray. We have found in practice that temporary zones of acid concentrations are formed if $H_2SO_4$ is added in concentrated form (60° Bé. or higher), and that the same result occurs even after relatively dilute acid is added in one or more large streams. Since it is known that urea forms most readily in acidified solutions of cyanamide, it is evident that said zones are to be avoided. To avoid zoning we employ $H_2SO_4$ of a somewhat lower density that 60° Bé. and introduce it into the well stirred extract in very finely divided streams. When the solution has been completely neutralized the precipitated calcium sulphate is removed by filtration and the filtrate concentrated until the greater part of the dicyandiamide will separate into the solid phase on cooling. The crystalline product may be removed and purified by well known methods.

What we claim is:

1. A process for the preparation of dicyandiamide, comprising mixing lime-nitrogen with water, heating to about 50° C., agitating the heated mixture for about thirty minutes, filtering the solution, adding to the filtrate enough sulphuric acid to combine with one-half the calcium therein, raising the temperature of the resulting mixture to 75° C. and maintaining that temperature for a period of two hours, adding sulphuric acid at a uniform rate during such period, removing the precipitated calcium sulphate by filtration, concentrating the filtrate, cooling the same to cause dicyandiamide to crystallize out and removing the crystalline mass.

2. A process for the preparation of dicyandiamide, comprising mixing lime-nitrogen with water, heating to 50° C. and at the same time agitating for about thirty minuets, filtering the solution, adding to the filtrate enough sulphuric acid to combine with one-half the calcium therein, raising the temperature of the mixture to not to exceed 85° C. and maintaining that temperature for a period of about two hours, adding sulphuric acid at a uniform rate during such period, removing the precipitated calcium sulphate, concentrating the remaining solution, cooling the same to cause the dicyandiamide to crystallize out and removing the crystalline mass.

3. A process for the preparation of dicyandiamide, including mixing lime-nitrogen with water, heating and agitating the solution, filtering the solution, adding to the filtrate enough sulphuric acid to combine with one-half the calcium therein, raising the temperature of the mixture to not to exceed 85° C. and maintaining said temperature for a period of about two hours, stirring the mixture, adding sulphuric acid at a uniform rate during such period, removing the precipitated calcium sulphate, concentrating the filtrate, cooling the same to cause dicyandiamide to crystallize out and removing the crystalline mass.

4. A process for the preparation of dicyandiamide, including mixing lime-nitrogen with water, heating and agitating the solution, filtering the solution, adding to the filtrate enough mineral acid to combine with one-half the calcium therein, raising the temperature of the resulting mixture to not to exceed 85° C. and maintaining such temperature for a period of about two hours, at the same time stirring the mixture, adding mineral acid at a uniform rate during such period, removing the precipitated calcium salt, concentrating the remaining solution, cooling the same to cause the dicyandiamide to crystallize out and removing the crystalline mass.

5. A process for the preparation of dicyandiamide, including extracting lime-nitrogen with water, filtering the extract, adding to the filtered extract sufficient sulphuric acid to combine with one-half the calcium in the extract, removing the calcium sulphate, adding to the remaining solution sulphuric acid in finely divided streams, removing the resulting calcium sulphate and recovering the dicyandiamide.

6. A process for the preparation of dicyandiamide, including extracting lime-nitrogen with water, filtering the extract, treating the filtered extract with sufficient sulphuric acid to combine with one-half the calcium present, removing the calcium sulphate, introducing into the remaining solution a spray of sulphuric acid, removing the resulting calcium sulphate and recovering the dicyandiamide.

7. A process for the preparation of dicyandiamide, including extracting lime-nitrogen with water, filtering the extract, treating the filtered solution with sulphuric acid in sufficient quantities to combine with one-half the calcium present in the solution, adding to the remaining solution sulphuric acid at a uniform rate while maintaining a temperature between 60° C. and 85° C. for a period of two hours, removing the resulting calcium sulphate and recovering the dicyandiamide.

HARRY C. HETHERINGTON.
JOSEPH M. BRAHAM.